United States Patent
Lee (10) Patent No.: US 8,428,876 B2
(45) Date of Patent: Apr. 23, 2013

(54) NAVIGATION SYSTEM FOR UPDATING PARTLY MAP LAYERS, AND METHOD FOR THE SAME

(75) Inventor: Jae Ok Lee, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 428 days.

(21) Appl. No.: 12/775,036

(22) Filed: May 6, 2010

(65) Prior Publication Data

US 2011/0130951 A1 Jun. 2, 2011

(30) Foreign Application Priority Data

Nov. 30, 2009 (KR) .................. 10-2009-0117156

(51) Int. Cl.
*G01C 21/00* (2006.01)

(52) U.S. Cl.
USPC ........................... 701/532; 701/451

(58) Field of Classification Search ............. 701/532, 701/451, 430, 409, 421, 411; 340/995.12, 340/990; 709/219, 204; 707/602, E17.002, 707/E17.005; 711/103, E12.008
See application file for complete search history.

(56) References Cited

U.S. PATENT DOCUMENTS

| | | | |
|---|---|---|---|
| 2003/0028316 A1* | 2/2003 | Miyahara | 701/208 |
| 2003/0220735 A1* | 11/2003 | Nimura | 701/208 |
| 2005/0130944 A1* | 6/2005 | Blye et al. | 514/170 |
| 2005/0203937 A1* | 9/2005 | Nomura | 707/102 |

FOREIGN PATENT DOCUMENTS

| | | |
|---|---|---|
| KR | 10-0576011 | 5/2005 |
| KR | 10-2007-0032644 | 3/2007 |
| KR | 10-0826553 B1 | 4/2008 |
| KR | 10-0902934 | 2/2009 |

* cited by examiner

*Primary Examiner* — Thomas Black
*Assistant Examiner* — Marthe Marc-Coleman
(74) *Attorney, Agent, or Firm* — Edwards Wildman Palmer LLP; Peter F. Corless

(57) ABSTRACT

The present invention features a navigation system for partly updating a map layer, and a method for the same, in which, by dividing a map into locally small data areas considering connectivity with adjacent areas, and updating only areas updated among the divided areas, the navigation system is able to minimize a size of the updated data, and delete unnecessary procedures for post-processing in a user terminal.

12 Claims, 6 Drawing Sheets

Layer 1 b)

Layer 2 c)

Layer 3

NAVIGATION SYSTEM FOR UPDATING PARTLY MAP LAYERS, AND METHOD FOR THE SAME

CROSS-REFERENCE TO RELATED APPLICATION

The present application claims under 35 U.S.C. §119(a) priority to Korean Patent Application Number 10-2009-0117156, filed on Nov. 30, 2009, the entire contents of which are incorporated herein for all purposes by this reference.

BACKGROUND OF THE INVENTION

1. Field of the Invention

The present invention relates, generally, to a navigation system, and more particularly to a navigation system for partially updating a map layer, and a method for the same, in which the navigation system may divide a map into locally small data areas, wherein the navigation system may update only certain updated areas among the divided areas.

2. Description of Prior Art

In general, a navigation system is suitably equipped to a type of moving object, such as a ship, an aircraft, a vehicle, and the like, so that the navigation system may provide the driver with information as to the current location of the moving object, calculate an optimum route to a desired destination, and guide the driver on the basis of the route.

In a navigation system, a navigation terminal generally stores map data, and visually guides the optimum route to a destination using the stored map data. That is, preferably, the navigation terminal stores numerical map data corresponding to information about real roads, buildings and facilities in accordance with a defined format, and suitably guides an optimum route to a destination for the moving object through a display screen by matching position information with the pre-stored map data, where the positional information is received from GPS. However, the real roads, buildings, facilities, or the like, may be frequently changed. Accordingly, the map data of the navigation terminal may need to be frequently updated in order to express real roads, buildings, facilities, or the like.

In order to update the map data, a conventional navigation system has generally updated all of the map data at the same time through an additional apparatus for storing the map data, in which the additional apparatus may be, for example, a CD, a DVD, an USB memory, or the like.

Recently, some navigation systems have been developed such that only a part of map may be updated via wire/wireless communication network. This technology for updating only a part of changed map may be a highly useful technology in an environment of reduced communication (data rate, communication cost, or the like).

A method for updating only a part of changed map may generally divide the map data into locally small data areas to be updated, and so may update only certain parts with data.

Various methods for securing the connectivity by automatic matching with adjacent links or various methods for updating the object-based map have been suggested. In performing these methods, unnecessary data transformation processes are added in the user terminal itself after receiving the modified data, and accordingly, such processes overload the navigation system. Further, it is difficult to correct errors which may occur during the process of data transformation, and it also difficult to easily manage the data history.

Accordingly, there is a need in the art for navigation systems that partly update a map layer.

The above information disclosed in this the Background section is only for enhancement of understanding of the background of the invention and therefore it may contain information that does not form the prior art that is already known in this country to a person of ordinary skill in the art.

BRIEF SUMMARY OF THE INVENTION

The present invention, in preferred aspects, provides a navigation system for updating partly a map layer, and a method for the same. Preferably, the present invention provides a navigation system, wherein, by dividing a map into locally small data areas and considering connectivity with adjacent areas, and suitably updating only areas updated among the divided areas, it may suitably minimize the size of the updated data, and further delete unnecessary procedures for post-processing in a user terminal.

In preferred embodiments, the present invention provides a navigation system for updating partly a map layer, and a method for the same, wherein each of objects for constituting a map may be suitably composed of a plurality of layers having connectivity with adjacent areas such as road data according to a data attribute and a data type, and accordingly, the navigation system of the present invention may update only layers to be required by suitably deciding that updated parts are included in a certain layer when an update of data occurs.

In a preferred embodiment of the present invention, a navigation system for updating partly a map layer may be provided, in which a management server suitably updates map data of a user terminal through a wireless communication network, the navigation system preferably comprising a management server for suitably transmitting an occurrence of update to the user terminal when map data are updated, in which the management server produces an update area and an update layer on the basis of a map data version which is suitably acquired by the user terminal, transmits a layer list and a data capacity which is produced, and transmits update data requested by the user terminal; and a user terminal for transmitting information about the map data version of its own, in which the user terminal produces the layer list to be updated, requests the update data, and suitably modifies old map data into the updated map data so that the data may be partly updated, wherein, the map data are suitably divided into a plurality of layer units having connectivity with adjacent areas on the basis of a data attribute and a data type, and the layer unit is suitably defined as a basic update unit.

According to preferred embodiments of the present invention, the map data are composed of a plurality of layer units such as road data which have the suitable connectivity with adjacent areas, in which the map preferably includes each of objects on the basis of the data attribute and the data type, and wherein, preferably where the update of the map data occurs, it is suitably decided that updated areas are included in a certain layer, and accordingly, only required layers are updated.

According to further preferred embodiments, the data attribute includes information about a remark, a background and a road, wherein, in examples where the data attribute corresponds to the remark, the data type preferably includes characters without the connectivity with adjacent areas, and, in examples where the data attribute corresponds to the background, the data type preferably includes a building, a green area, a water area or a housing complex without the suitable connectivity with adjacent areas, and, in case where the data attribute corresponds to the road, the data type preferably includes an express way, a highway, a provincial road, a special metropolitan city road, a Si-road, a Gun-road or a Gu-road which has connectivity with adjacent areas.

According to other further preferred embodiments, the layers of the data are suitably divided on the basis of the objects having different data attributes, or, in case where the objects have the same data attributes, it is able to allocate the layers which are suitably divided and defined on the basis of the data type.

According to other preferred embodiments, the management server comprises a data transmitting unit for suitably transmitting the data with the user terminal through the wireless communication network; a layer management unit for suitably managing the information about the map data version, and for suitably dividing the map data into a plurality of layer units on the basis of an area unit as well as the data attribute and the data type, wherein, after comparing the map data version received from the user terminal with the latest map data version of the management server, the layer management unit produces information about the modified update area, the layer list and the data capacity, and suitably transmits the update data which are requested from the user terminal; and a map DB for storing the map data corresponding to the version information and the map data which are divided into the layer units.

Preferably, the user terminal comprises a data transmitting unit for transmitting the data with the management server through the wireless communication network; a data updating and processing unit for updating partly the map data by each of layers according to the map data which are received from the management server; and a map DB for storing the old map data corresponding to old version information, and for additionally storing the map data processed by the data updating and processing unit, in which the map data are suitably divided into the layer units.

Preferably, the user terminal, if the pre-updated layer is existed in the received list, excludes the pre-updated layer, and concludes the list to be acquired for the last time.

In another aspect of the present invention, a method for updating partly a map layer of a navigation system may preferably be provided, in which a management server suitably updates map data of the navigation system in a user terminal through a wireless communication network, the method comprising the steps of a) suitably receiving an occurrence of update from the management server when the map data are suitably updated, and transmits information about the map data version of its own to the management server, which is preferably performed by the user terminal; b) suitably producing an update area and an update layer on the basis of a map data version suitably acquired by the user terminal, and transmitting a layer list and a data capacity to the user terminal, which is performed by the management server; c) suitably producing the layer list to be updated, and suitably requesting the update data to the management server, which is performed by the user terminal, in which the update data includes an update area and a layer list which are required for the last time; d) suitably transmitting the update data to the user terminal, which is performed by the management server, in which the update data are requested from the user terminal; and e) suitably modifying old map data into the updated map data, and updating the map partly, which is suitably performed by the user terminal, wherein the map data are suitably divided into a plurality of layer units having connectivity with adjacent areas on the basis of a data attribute and a data type, and the layer unit is d suitably defined as a basic update unit.

Preferably, in the step of b), the management server produces information about the modified update area, the layer list and the data capacity after comparing the map data version received from the user terminal with the latest map data version of the management server.

Preferably, the produced layer list of the step of b) includes a layer version by each of layers.

Preferably, in step c), the user terminal suitably excludes the pre-updated layer if the pre-updated layer is existed in the received list, and suitably concludes the list to be acquired for the last time.

According to further preferred embodiments of the present invention, by dividing a map into locally small data areas considering the connectivity with adjacent areas, and updating only areas updated among the divided areas, the present invention may suitably minimize the size of the updated data, and delete unnecessary procedures for post-processing in a user terminal. And accordingly, it may not overload a navigation system. Further, it is possible to easily correct errors which may occur during a process of data transformation, and easily manage the data history.

According to other further embodiments of the present invention, each of the objects for constituting a map may preferably be composed of a lot of layers having suitable connectivity with adjacent areas such as road data according to a data attribute and a data type, and then, by deciding that updated parts are suitably included in a certain layer when an update of data occurs, it is possible to update only layers to be required.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE PREFERRED EMBODIMENTS

As described herein, the present invention features a navigation system for partly updating partly a map layer comprising a management server for transmitting an update to a user terminal when map data are updated and a user terminal for transmitting information about the map data, wherein, the map data are divided into a plurality of layer units having connectivity with adjacent areas on the basis of a data attribute and a data type, and the layer unit is defined as a basic update unit.

In one embodiment, the management server produces an update area and an update layer on the basis of a map data version which is acquired by the user terminal, transmits a layer list and a data capacity which is produced, and transmits update data requested by the user terminal.

In another embodiment, the user terminal produces a layer list to be updated, requests the update data, and modifies old map data into the updated map data so that the data may be updated.

In another further embodiment, a management server updates map data of a user terminal through a wireless communication network.

In still another embodiment, the plurality of layer units correspond to road data.

The invention also features a method for updating partly a map layer of a navigation system, in which a management server updates map data of the navigation system in a user terminal through a wireless communication network, the method comprising the steps of a) receiving an occurrence of update from the management server when the map data are updated, and transmitting information about the map data version of its own to the management server, which is performed by the user terminal b) producing an update area and an update layer on the basis of a map data version acquired by the user terminal, and transmitting a layer list and a data capacity to the user terminal, which is performed by the management server c) producing the layer list to be updated, and requesting the update data to the management server, which is performed by the user terminal, in which the update data includes an update area and a layer list which are required for the last time d) transmitting the update data to the user terminal, which is performed by the management server, in which the update data are request from the user terminal; and e) modifying old map data into the updated map data, and updating the map partly, which is performed by the user terminal, wherein, the map data are divided into a lot of layer units having connectivity with adjacent areas on the basis of a data attribute and a data type, and the layer unit is defined as a basic update unit.

Figure 1:
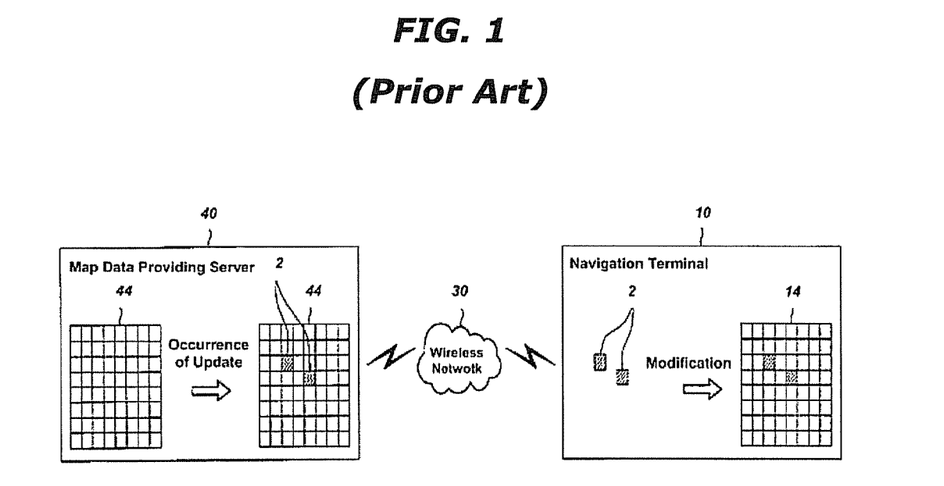
FIG. 1 is a view for explaining a method of updating map data in a navigation system according to the prior art.

FIG. 1 is an exemplary view of a method of updating map data in a navigation system according to the prior art.

Referring to FIG. 1, a navigation system according to the prior art may include a navigation terminal 10 equipped to each kind of moving object such as a vehicle, a ship, an aircraft, or the like, and a map data providing a server 40 for providing map data for the navigation terminal 10, in which the map data is suitably updated through a wireless network 30.

The map data providing server 40 digitalizes map information, and divides the information, that is, a map for specific area into cells of N times. The map data providing server 40 stores the cells of N times, and assigns an address to each of the divided cells. If a file size of the divided cells exceeds a defined size able to be transmitted via the wireless network 30, the map data providing server 40 divides the cells into subdivided cells, and checks the subdivided cells again. If the file size of the subdivided cells exceeds the defined size, the map data providing server 40 divides the subdivided cells into more subdivided cells. Such dividing process is repeated until all of the cells are divided into the defined size able to being transmitted via the wireless network 30.

The map data providing server 40 for dividing the total of the map data areas 44 into the small cell areas and storing the cell areas, may transmit the total data of the cell areas 2 to the navigation terminal 10 via the wireless network 30, in which, if parts of data areas are updated among the total of the map data areas 44, the updated data are included in the total data of the cell areas 2.

When the updated data are included in the total data of the cell areas 2, the navigation terminal 10 receives the total data of the cell areas 2 from the map data providing server 40 via the wireless network 30, and updates the total of the corresponding cell areas in the total of the map data areas 14 which is pre-stored.

In the above-described method for updating the map data according to the prior art, the navigation terminal 10 must download a high capacity of data since it downloads and updates the total data of the cell areas 2 which is updated. Accordingly, a user of the navigation terminal 10 must pay high rates for the wireless network.

Korean Patent Number 10-0576011 (Filing date: 25 Nov. 2003), incorporated by reference in its entirety herein, provides a "NAVIGATION SYSTEM FOR UPDATING MAP DATA USING MAP MODIFYING COMMAND, AND METHOD FOR THE SAME", that is described with reference to FIGS. 2 and 3.

Figure 2:
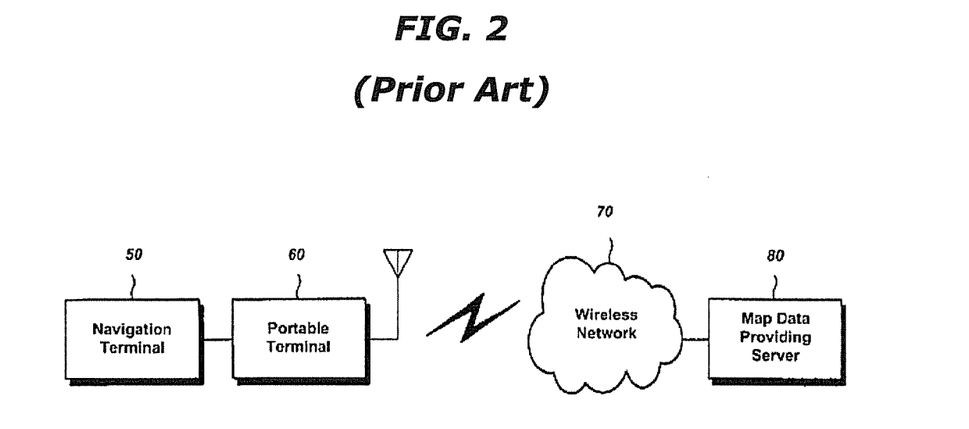
FIG. 2 is a schematic block diagram of an exemplary navigation system for updating map according to the prior art.
Figure 3:
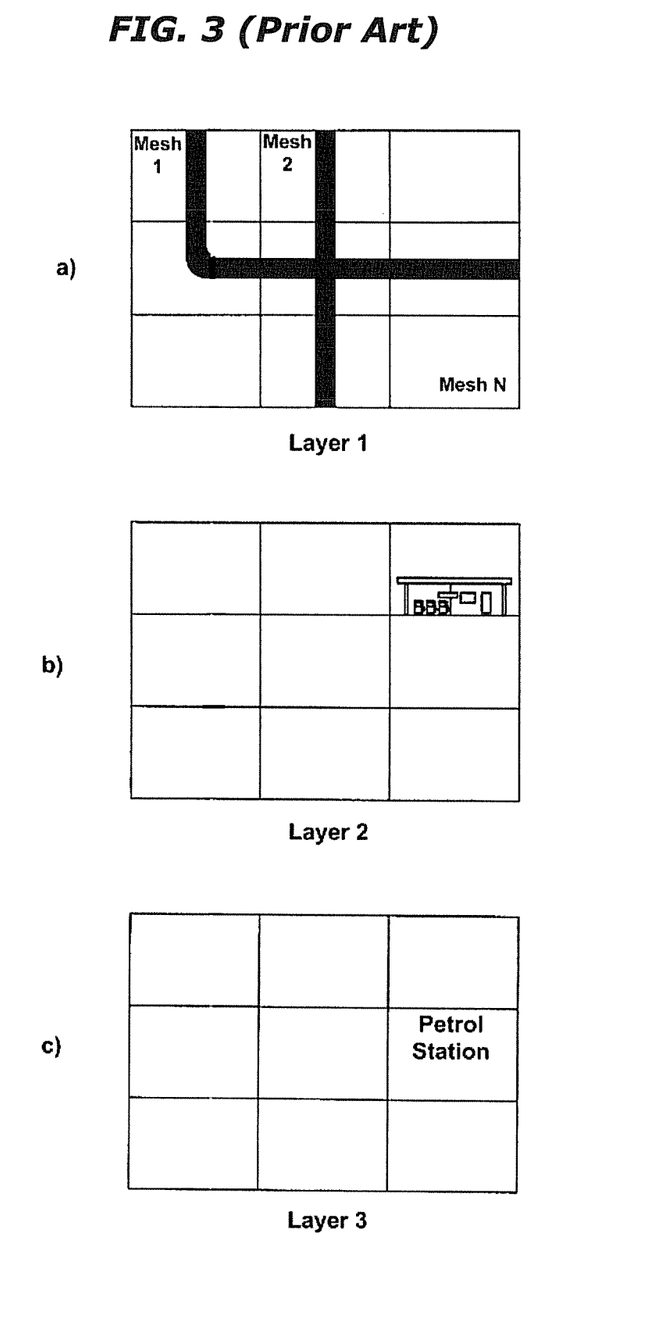
FIG. 3 is an exemplary view for illustrating map data which is stored in a map data providing server according to the prior art.

FIG. 2 is a schematic block diagram of a navigation system for updating map according to the prior art, and FIG. 3 is a view for illustrating map data which is stored in a map data providing server according to the prior art.

Referring to FIG. 2, the navigation system for updating map according to the prior art may include a navigation terminal 50, a portable terminal 60, and a map data providing server 80.

The map data providing server 80 digitalizes map information for a specific area, and stores the map information. If specific map data is modified among the total map data, the map data providing server 80 creates a command for modifying the map corresponding to the modified map data, defines a version of the command, and transmits version information via the wireless network 70.

The portable terminal 60 receives the command for modifying the map via the wireless network 70, and transmits the command to the navigation terminal 50.

The navigation terminal 50 receives the command for modifying the map, decodes it, and modifies the pre-stored map data corresponding to the decoded command. Here, the map data has a mesh structure divided into defined sizes, and is composed of a plurality of layers divided according to informational attributes. For example, a) of FIG. 3 illustrates the first layer corresponding to road information having a mesh structure (1~N). Further, for example, a) of FIG. 3 illustrates the second layer corresponding to building information, and c) of FIG. 3 illustrates the third layer corresponding to name information of building or road. In examples where a number of layers divided according to the information attribute are combined, they may be displayed as map information on a display screen. For example, the first to third layers are combined to be displayed.

In particular, if the map data are modified, the map data providing server 80 creates a command for modifying the map corresponding to the modified map data. For example, as shown in b) of FIG. 3, in examples where a petrol station in the map data is added, deleted or modified on the coordinate of the second mesh (Mesh 2) in the second layer, the map data providing server 80 creates the command for modifying the map, and then, defines a version for the created command, in which the version information is included in the command for modifying the map in order to distinguish it from the information of the command. After including version information in the command for modifying the map, the map data providing server 80 transmits the command to the portable terminal 60 via the wireless network 70, in which the portable terminal 60 is connected with the navigation terminal 50. The portable terminal 60 receives the command, and delivers it to the navigation terminal 50. And then, the navigation terminal 50 decodes the command received from the portable terminal 60, and modifies the pre-stored map corresponding to the command.

The above-described navigation system for updating a map according to Korean Patent Number 10-0576011 uses a method having a mesh structure which divides the map data into the defined size, wherein it comprises at least one or more layers divided according to the informational attribute, and updates only the required layers. Accordingly, as real roads, buildings or facilities are modified, the map data may be updated by an outside manager, but the areas of updated data may enlarge excessively when updating map data that has connectivity with adjacent areas. That is, it is useful to include data items such as a remark (characters), a background (building, green area, water area, housing complex, and the like) on the map not having the connectivity with adjacent areas, but, it is not useful to include data items such as linked road data having the connectivity with adjacent areas. Accordingly, there can be a problem that updated data areas may excessively enlarge since one modification produces a modification of adjacent areas.

With reference to the accompanying drawings, reference will now be made in detail to exemplary embodiments of the present invention so that those skilled in the art may embody easily. But, the present invention may be embodied in various embodiments, which are not limited by the embodiments illustrated herein. In the accompanying drawings, some elements regardless of the description of the present invention are omitted in order to describe the present invention clearly, and, like reference numerals refer to the like elements throughout.

A preferred embodiment of the present invention features a navigation system for partly updating the map layer that includes a process for dividing a map into locally small data areas and updates only updated areas among the divided areas, and wherein in order to prevent updating unnecessary data regardless of areas which are little modified in the conventional system, the present invention allows each of the objectives for constituting the map to be composed of a plurality of layers according to a data attribute and a data type. Accordingly, in further preferred embodiments, the navigation system of the present invention decides that updated areas are suitably included in a certain layer so that only required layers may be suitably updated.

A principle for updating partly the map layer according to a preferred embodiment of the present invention is explained with reference to FIGS. 4 and 5.

Figure 4:
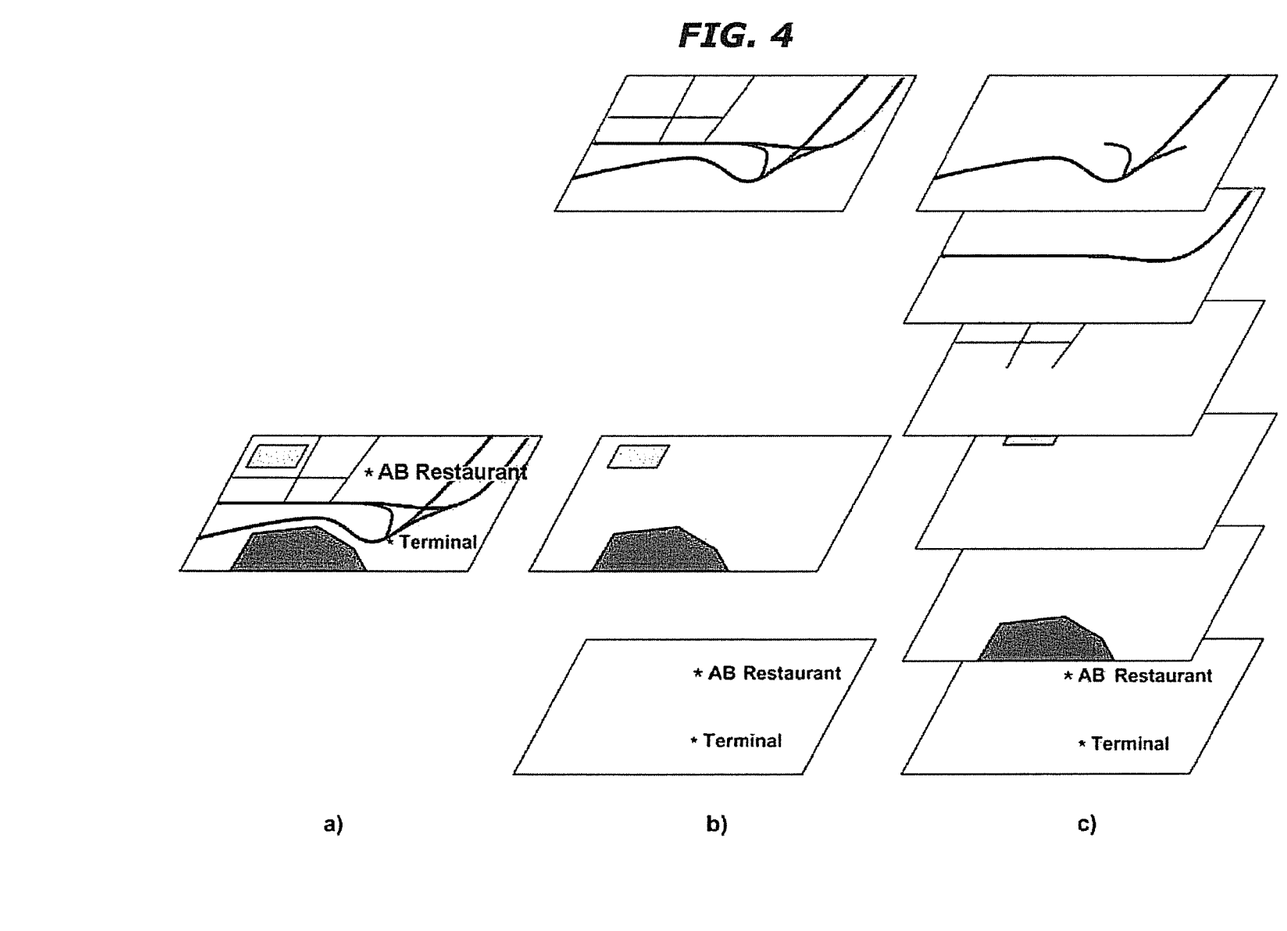
FIG. 4 is a schematic diagram of an exemplary concept of a map layer in a navigation system for updating partly the map layer according to an embodiment of the present invention.

FIG. 4 is a schematic diagram of a concept of a map layer in a navigation system for updating partly the map layer according to a preferred embodiment of the present invention.

According to certain exemplary embodiments, FIG. 4 is a schematic diagram of a concept of a map layer in a navigation system for updating partly a map layer, wherein, a) of FIG. 4 illustrates a constitution of data, b) of FIG. 4 illustrates divides according to data attributes, for example, a remark, a background and a road, and c) of FIG. 4 illustrates divides according to data types, for example, an express way, a highway, a provincial road, a special metropolitan city road, a Si-road, a Gun-road, a Gu-road, or the like.

According to other further embodiments, and referring to FIG. 4, the navigation system for updating partly the map layer relates to a system for updating a part of map, wherein each of the objectives for constituting the map are suitably composed of a lot of layers according to a data attribute and a data type in order to prevent the system from updating unnecessary data regardless of the areas which are little modified in the conventional system. Preferably, after deciding that updated areas are suitably included in a certain layer, only required layers may be suitably updated.

Preferably, the data layer may be suitably classified according to objects having different attributes, but the data layer may be suitably allocated if it will be classified and defined by a data type even though the objects are the same attributes. For example, since the remark, background and road of the map data are data having quite different attributes, they may become different layers from each other. Further, the data layers may become each of layers according to the different data types even though the road or the background has the same data attributes, for example, an express way, a highway, a provincial road, a special metropolitan city road, a Si-road, a Gun-road or a Gu-road.

According to other further embodiments, for example as shown in a) to c) of FIG. 4, in case where a modification of a specific layer which is divided according to a type of roads occurs, only a corresponding layer is not suitably updated, and the specific layer has the connectivity with other layers according to the characteristics of roads. Preferably, if an express way is newly opened, it is connected with the roads of different levels (for example, a highway) through an interchange or intersection. Further, the connected layers may become targets of update according to an opening of new roads.

Preferably, in other further embodiments, all connected roads may become the target of update by the above-described principles. Further, by deciding whether the shape (link) and the connectivity (node) of the connected layer are added or deleted, the update may be suitably decided. Preferably, in the data of specific areas, if a link or a node is newly added to the specific layer data, it may consider that the modified layers do not exist.

Figure 5:
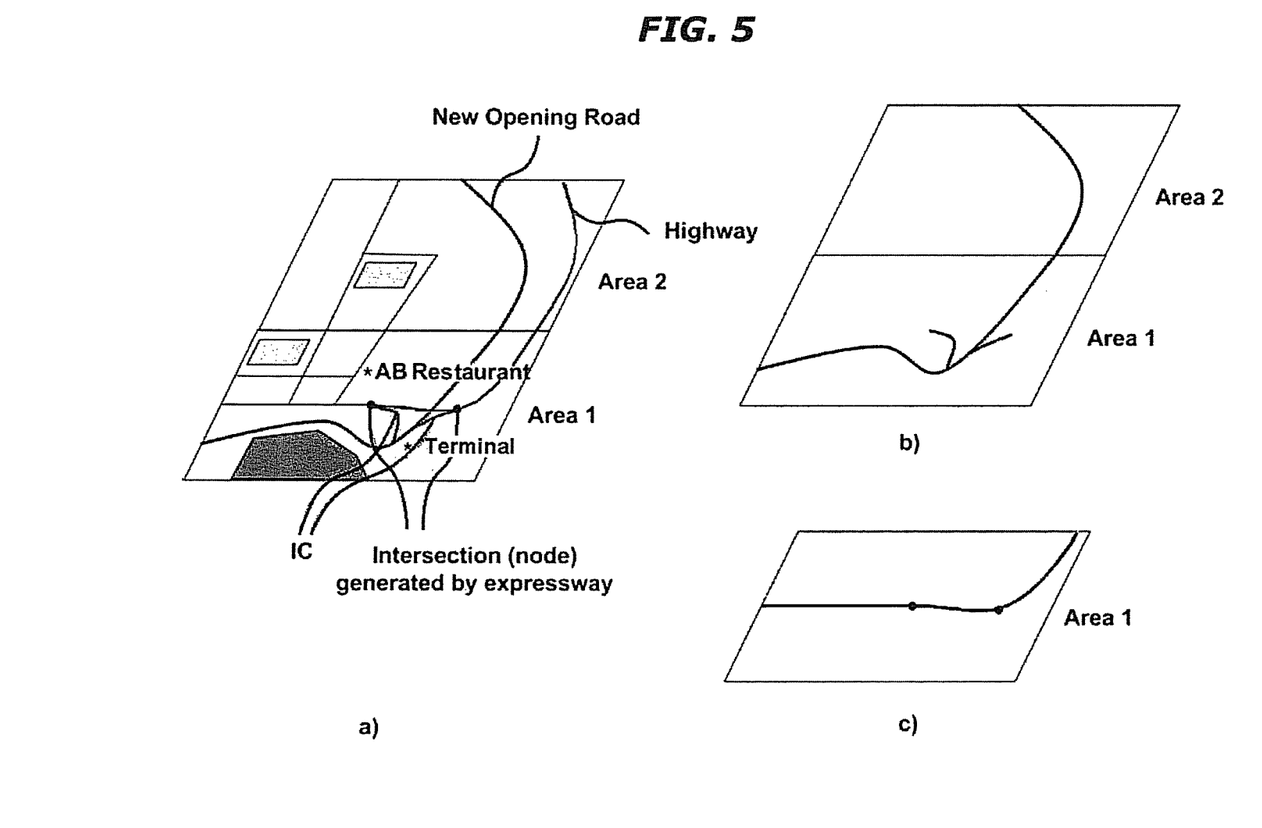
FIG. 5 is a schematic diagram of a principle for additionally deciding a shape and connectivity in a navigation system for updating partly a map layer according to an embodiment of the present invention.

In other preferred embodiments, for example as shown in FIG. 5, FIG. 5 is a schematic diagram of a principle for additionally deciding a shape and connectivity in a navigation system for updating partly a map layer. In particular, a) of FIG. 5 illustrates an example of a new opening express way, b) of FIG. 5 illustrates the expressway layers as the target of update, and c) of FIG. 5 illustrates highway layers as the target of update. As described herein, the roads may include an express way, a highway, a provincial road, a special metropolitan city road, a Si-road, a Gun-road or a Gu-road, however are understood not to be limited as such.

According to certain preferred embodiments, for example as shown in FIG. 5, where a specific road, for example, an expressway is newly opened, the new opening road is suitably connected with a general road, for example, a highway. Although a shape of the highway connected with the expressway is not suitably modified, a node (intersection) may occur in the highway by connecting with the new opening road.

Preferably, in examples where the node is suitably generated or deleted, the corresponding layer (for example, a highway layer) may become the target of update as well. For example, in further preferred embodiments, for example, as shown in b) of FIG. 5, the new opening road may become the target of update, and, shown in c) of FIG. 5, the connected highway may become the target of update as well.

In other embodiments, for example, in case of c) of FIG. 5, the second area is not suitably included. Although a highway of the first area is suitably connected with the second area, a highway of the second area is suitably excluded from the target of update since the link or node is not modified.

Accordingly, as shown in b) and c) of FIG. 5, a method for updating partly a map layer according to an exemplary embodiment of the present invention may suitably receive the minimum data for updating from the management server, in which the minimum data are really modified. Accordingly, the navigation system of the user terminal may complete the update by simply replacing the data layer without an edit process.

Figure 6:
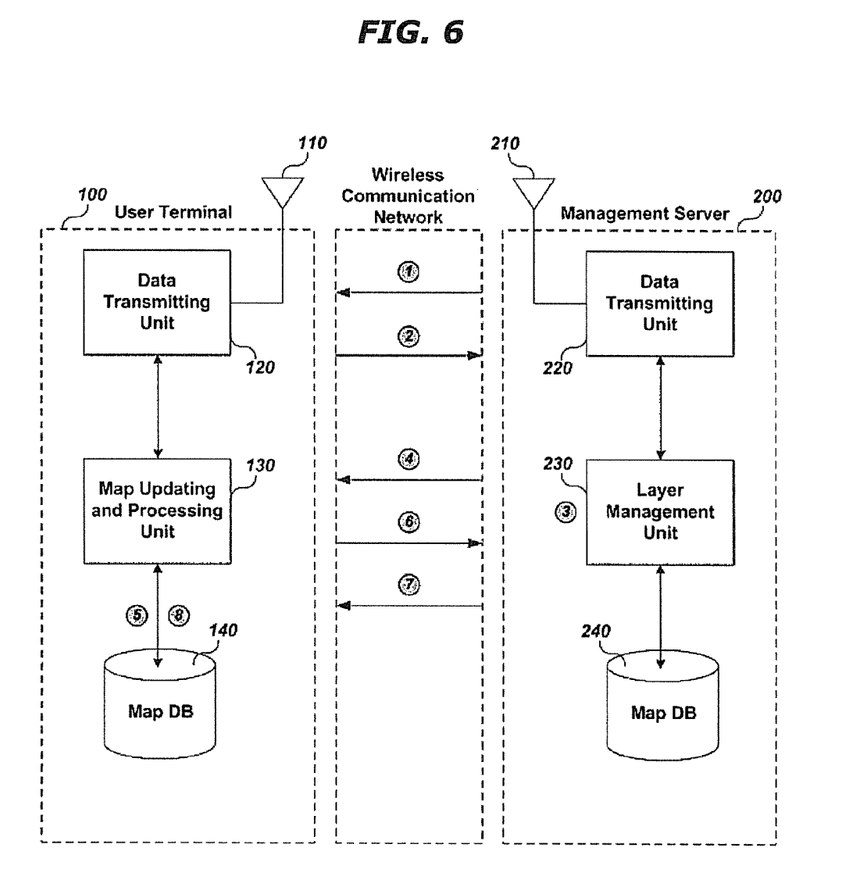
FIG. 6 is a block diagram of a navigation system for updating partly a map layer according to an embodiment of the present invention.
Figure 7:
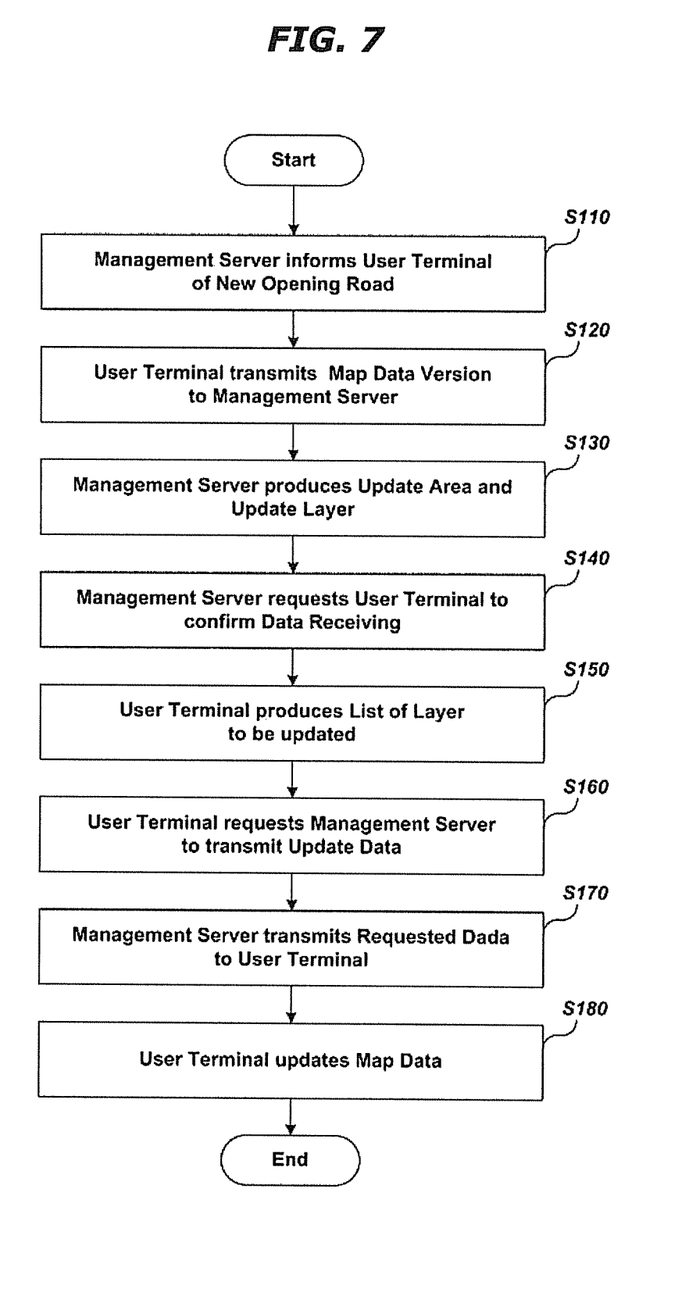
FIG. 7 is a flowchart of a method for updating partly a map layer in a navigation system according to an embodiment of the present invention.

In other exemplary embodiments, for example as shown in FIG. 6, FIG. 6 is a block diagram of a navigation system for updating partly a map layer according to an exemplary embodiment of the present invention, and FIG. 7 is a flowchart of a method for updating partly a map layer in a navigation system according to another exemplary embodiment of the present invention.

In certain preferred embodiments and referring to FIG. 6, the navigation system for updating partly a map layer according to an embodiment of the present invention may preferably include a user terminal 100 and a management server 200, wherein the user terminal 100 may preferably include an antenna 110, a data transmitting unit 120, a map updating and processing unit 130, and a map DB 140, and the management server 200 may preferably include an antenna 210, a data transmitting unit 220, a layer management unit 230 and a map DB 240.

Preferably, in certain embodiments, the management server 200 transmits an occurrence of update to the user terminal 100 when map data are updated, and it produces update areas and update layers on the basis of a map data version which is acquired by the user terminal 100. In other further embodiments, the management server 200 suitably transmits a layer list and a data capacity produced to the user terminal 100. In addition, the management server 200 suitably transmits the requested update data to the user terminal 100.

Preferably, the user terminal 100 suitably transmits information about the map data version of its own into the management server 200. In other further embodiments, the user terminal 100 produces the layer list to be updated, requests the update data to the management server 200, and modifies old map data into the updated map data so that the data may be partly updated.

Preferably, the map data may be suitably divided into a lot of layer-units having the connectivity with adjacent areas on the basis of a data attribute and a data type, and the layer unit may be suitably defined as a basic update unit.

Further, the map data are suitably composed of a plurality of layer units such as road data which have suitable connectivity with adjacent areas, in which the map preferably includes each of objects on the basis of the data attribute and the data type, and wherein, in case where the update of the map data occurs, it is decided that updated areas are suitably included in a certain layer, and accordingly, only required layers are updated.

According to other further embodiments, the data attribute preferably includes information about a remark, a background and a road, wherein, in case where the data attribute corresponds to the remark, the data type may include characters without the connectivity with adjacent areas, and, in case where the data attribute corresponds to the background, the data type may include a building, a green area, a water area or a housing complex without the connectivity with adjacent areas, and, in case where the data attribute corresponds to the road, the data type may include an express way, a highway, a provincial road, a special metropolitan city road, a Si-road, a Gun-road or a Gu-road which has connectivity with adjacent areas, which are not limited thereto. In still other further embodiments of the present invention, the layers of the data are suitably divided on the basis of the objects having different data attributes, or, in case where the objects have the same data attributes, it is able to allocating the layers which are divided and defined on the basis of the data type.

In particular embodiments, the data transmitting unit 220 of the management server 200 transmits the data with the data transmitting unit 120 of the user terminal 100 through the wireless communication network and the antenna 210.

Preferably, the layer management unit 230 of the management server 200 manages the information about the map data version, and suitably divides the map data into a lot of layer units on the basis of an area unit as well as the data attribute and the data type. Further, after comparing the map data version received from the user terminal 100 with the latest map data version of the management server 200, the layer management unit 230 may preferably produce information about the modified update area, the layer list and the data capacity, and then, may transmit the requested update data to the user terminal 100.

Preferably, the map DB 240 of the management server 200 stores the map data corresponding to the version information and the map data which are divided into the layer units.

Further, the data transmitting unit 120 of the user terminal 100 suitably transmits the data with the data transmitting unit 220 of the management server 200 through the wireless communication network and the antenna 110.

According to still further preferred embodiments, the data updating and processing unit 130 of the user terminal 100 updates partly the map data by each of layers according to the map data which are received from the management server 200.

Preferably, the map DB 140 of the user terminal 100 stores the old map data corresponding to old version information, and for additionally storing the map data processed by the data updating and processing unit 130, in which, the map data are suitably divided into the layer units. Here, preferably, the user terminal 100, if the pre-updated layer is existed in the received list, suitably excludes the pre-updated layer, and concludes the list to be acquired for the last time.

In other exemplary embodiments, the processes of ① to ⑧ as shown in FIG. 6 may preferably correspond to the steps of S110 to S180 of FIG. 7. The method for updating partly a map layer of a navigation system according to an exemplary embodiment of the present invention is explained with reference to FIG. 7.

According to certain preferred embodiments and referring to FIG. 7, for example, the method for updating partly a map layer of a navigation system is provided, wherein the management server 200 suitably updates map data of the navigation system in the user terminal 100 through a wireless communication network. Preferably, the management server 200 transmits information for new opening road to the user terminal 100 when the map data are updated (S110).

In further preferred embodiments, the user terminal 100 suitably transmits information about the map data version of its own to the management server 200 (S120).

Further, the management server 200 produces an update area and an update layer on the basis of a map data version that is suitably acquired by the user terminal 100 (S130). Preferably, after the management server 200 compares the map data version received from the user terminal 100 with the latest map data version of the management server, it produces information about the modified update area, information about the layer list and information about the data capacity.

Further, the management server 200 suitably transmits the produced layer list and data capacity to the user terminal 100 (S140). Here, the produced layer list may preferably include a layer version by each of layers.

Preferably, the user terminal 100 produces the layer list to be suitably updated (S150). In further related embodiments, the user terminal 100 excludes the pre-updated layer if the pre-updated layer is existed in the received list, and concludes the list to be acquired for the last time.

Preferably, in a further embodiment, the user terminal 100 requests the update data to the management server 200, in which the update data preferably includes the update area and the layer list to be acquired for the last time (S160).

Preferably, in a further embodiment, the management server 200 transmits the update data to the user terminal 100, in which the update data are request from the user terminal 100 (S170).

Preferably, in a further embodiment, the user terminal 100 suitably modifies old map data into the updated map data, and updates the map partly (S180). Accordingly, by selecting the data divided into layers as a basic update unit, it is possible to suitably minimize the size of update data, and accordingly, replace the data partly.

According to preferred embodiments of the present invention described herein, by dividing a map into locally small data areas considering the connectivity with adjacent areas, and suitably updating only areas updated among the divided areas, it is possible to minimize a size of the updated data, and delete unnecessary procedures for post-processing in a user terminal. Further, each of objects for constituting a map may be suitably composed of a plurality of layers having connectivity with adjacent areas such as road data according to a data attribute and a data type, and accordingly, it may suitably update only layers to be required by deciding that updated parts are included in a certain layer when an update of data occurs.

The foregoing description of the present invention is intended to be illustrative, and those of ordinary skill in the art will understand that the present invention may be changed into other specific forms without modifying technical conceptions or essential characteristics according to the present invention. Therefore, it is to be understood that the above-described embodiment is to be illustrative not to be definitive.

The present invention is intended to fall within the scope of the following appended claims not within the scope of the detailed description, and accordingly, it must be understood that the meaning and scope of the appended claims and all such changes, modifications and variations induced by the equivalents are included in the scope of the present invention.

What is claimed is:

1. A navigation system for updating partly a map layer, in which a management server updates map data of a user terminal through a wireless communication network, the navigation system comprising:

a management server configured to transmit an occurrence of update to the user terminal when map data is updated, in which the management server produces an update area and an update layer based on a map data version which is acquired by the user terminal, transmits a layer list and a data capacity which is produced, and transmits update data requested by the user terminal; and a user terminal configured to transmit information about the map data version of that user terminal, in which the user terminal produces the layer list to be updated, requests the update data, and modifies old map data into the updated map data so that the data may be partly updated, wherein, the map data is divided into a plurality of layer units having connectivity with adjacent areas based on a data attribute and a data type, and the layer unit is defined as a basic update unit, wherein, the map data is composed of a plurality of layer units, including road data, which has connectivity with adjacent areas, in which the map includes each of a plurality of objects based on the data attribute and the data type, and wherein, when the update of the map data occurs, a determination is made that updated areas are included in a certain layer, and accordingly, only required layers are updated.

2. The navigation system of claim 1, wherein, the data attribute includes information about a remark, a background and a road, wherein, in case where the data attribute corresponds to the remark, the data type includes characters without the connectivity with adjacent areas, and, in case where the data attribute corresponds to the background, the data type includes a building, a green area, a water area or a housing complex without the connectivity with adjacent areas, and, in case where the data attribute corresponds to the road, the data type includes an express way, a highway, a provincial road, a special metropolitan city road, a Si-road, a Gun-road or a Gu-road which has connectivity with adjacent areas.

3. The navigation system of claim 1, wherein, the layers of the data are divided on the basis of the objects having different data attributes, or, when the objects have the same data attributes, the data allocates the layers which are divided and defined based on the data type.

4. The navigation system of claim 1, wherein, the management server comprises:

a data transmitting unit configured to transmit the data with the user terminal through the wireless communication network;

a layer management unit configured to manage the information about the map data version, and divide the map data into a plurality of layer units based on an area unit as well as the data attribute and the data type, in which, after comparing the map data version received from the user terminal with a latest map data version of the management server, the layer management unit produces information about the modified update area, the layer list and the data capacity, and transmits the update data which is requested from the user terminal; and a map database configured to store the map data corresponding to the version information and the map data which is divided into the layer units.

5. The navigation system of claim 1, wherein, the user terminal comprises:

a data transmitting unit configured to transmit the data with the management server through the wireless communication network;

a data updating and processing unit configured to update partly the map data at each layer according to the map data which is received from the management server; and a map database configured to store the old map data corresponding to old version information, and additionally store the map data processed by the data updating and processing unit, in which the map data is divided into the layer units.

6. The navigation system of claim 5, wherein, the user terminal, when a pre-updated layer exists in the received list, excludes the pre-updated layer, and concludes the list to be acquired for the last time.

7. A method for updating partly a map layer of a navigation system, in which a management server updates map data of the navigation system in a user terminal through a wireless communication network, the method comprising:

a) receiving an occurrence of update from the management server when the map data is updated, and transmitting information about the map data version of the user terminal to the management server, which is performed by the user terminal;

b) producing an update area and an update layer based on a map data version acquired by the user terminal, and transmitting a layer list and a data capacity to the user terminal, which is performed by the management server;

c) producing the layer list to be updated, and requesting the update data to the management server, which is performed by the user terminal, in which the update data includes an update area and a layer list which are required for the last time;

d) transmitting the update data to the user terminal, which is performed by the management server, in which the update data is requested from the user terminal; and e) modifying old map data into updated map data, and updating the map partly, which is performed by the user terminal, wherein, the map data is divided into a plurality of layer units having connectivity with adjacent areas based on a data attribute and a data type, and the layer unit is defined as a basic update unit, wherein, the map data is composed of a plurality of layer units including road data which has connectivity with adjacent areas, in which the map includes each of a plurality of objects based on the data attribute and the data type, and wherein, when the update of the map data occurs, a determination is made that updated areas are included in a certain layer, and accordingly, only required layers are updated.

8. The method of claim 7, wherein, the data attribute includes information about a remark, a background and a road, wherein, in case where the data attribute corresponds to the remark, the data type includes characters without the connectivity with adjacent areas, and, in case where the data attribute corresponds to the background, the data type includes a building, a green area, a water area or a housing complex without the connectivity with adjacent areas, and, in case where the data attribute corresponds to the road, the data type includes an express way, a highway, a provincial road, a special metropolitan city road, a Si-road, a Gun-road or a Gu-road which has connectivity with adjacent areas.

9. The method of claim 7, wherein, the layers of the data is divided based on the plurality of the objects having different data attributes, or, when the objects have the same data attributes, the data allocates the layers which are divided and defined based on the data type.

10. The method of claim 7, wherein, in the step of b), the management server produces information about the modified update area, the layer list and the data capacity after comparing the map data version received from the user terminal with the latest map data version of the management server.

11. The method of claim 7, wherein, the produced layer list of the step of b) includes a layer version by each of the layers.

12. The method of claim 7, wherein, in the step of c), the user terminal excludes a pre-updated layer when the pre-updated layer exists in the received list, and concludes the list to be acquired for the last time.

* * * * *